Figure 1:
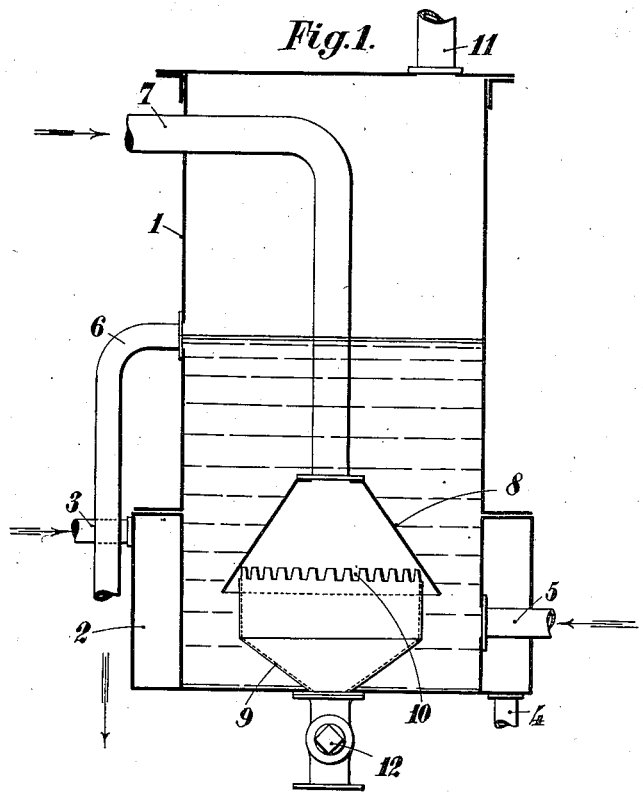

H. GOUTHIÉRE & P. DUCANCEL.
PROCESS OF TREATING WASTE GAS PURIFYING MATERIAL.
APPLICATION FILED JUNE 9, 1911.

1,051,882.

Patented Feb. 4, 1913.

Witnesses.

Inventors:
Henri Gouthière
Pierre Ducancel
by Bernie Goldsborough & O'Neill
Attys

UNITED STATES PATENT OFFICE.

HENRI GOUTHIÉRE AND PIERRE DUCANCEL, OF RHEIMS, FRANCE.

PROCESS OF TREATING WASTE GAS-PURIFYING MATERIAL.

1,051,882.  Specification of Letters Patent.  Patented Feb. 4, 1913.

Application filed June 5, 1911. Serial No. 631,389.

*To all whom it may concern:*

Be it known that we, HENRI GOUTHIÉRE and PIERRE DUCANCEL, citizens of the French Republic, residing at Rheims, Department of the Marne, in France, have invented certain new and useful Improvements in Processes of Treating Waste Gas-Purifying Material; and we do hereby declare the following to be a full, clear, and exact description of the invention, such as will enable others skilled in the art to which it appertains to make and use the same.

The invention relates to a process for permitting the simultaneous extraction of sulfur and cyanids contained in the spent materials which have been used for purifying gas.

This process comprises a treatment by an alkaline sulfid or alkaline earth, preferably the neutral ammonium sulfid, so as to form a polysulfid of ammonium. The mass having been filtered, the solution obtained is treated so as to decompose the polysulfid of ammonium so as to produce sulfur. This decomposition is effected by means of heat, or rather by subjecting the solution to the action of a current of steam which precipitates the sulfur and entrains the ammonium sulfid which is thus recovered. The residue left in the filter is immediately diluted with water, then treated with lime at boiling point excluded from the air. After filtration is left a residue formed of ferric hydroxid and iron sulfid, which, once oxidized in the air, gives a regenerated purifying material. The exhausted materials which have been used to purify the gas, are added in a cold state to a solution of neutral ammonium sulfid. The operation is effected in closed receptacles provided with mechanical agitators. The ammonium sulfid dissolves the sulfur forming a polysulfid of ammonium. It also dissolves the sulfocyanids and renders soluble a quantity of Prussian blue in the form of ammonium ferrocyanid. It furthermore transforms the iron oxid into sulfid with fixation of ammonia very probably forming a double sulfid of iron and ammonium. Upon filtering the material obtained, a solution is obtained composed of polysulfid of ammonium, of ferrocyanids and of sulfocyanids and there remains in the filter a solid residue containing iron sulfid, calcium sulfate, wood saw-dust and the portion of the Prussian blue which was not dissolved by the ammonium sulfid. The solution and the residue are then treated separately. It is preferable to effect the decomposition of the higher sulfid of ammonium by subjecting the solution to the action of a current of steam which entrains the ammonium sulfid. The greater part of the latter is thus recovered and can be used for a fresh operation; there remains in the apparatus a residual liquid composed of ferrocyanids, sulfocyanids and containing in suspension precipitated sulfur which is separated by filtration. The solid residue obtained after filtering the purifying material treated by ammonium sulfid is immediately diluted with water or better still with the residual liquid separated from the precipitated sulfur, and is then treated at boiling point with lime. By this treatment, the ammonia contained in the ferrocyanids, the ammonium sulfocyanids and the double sulfid of iron and ammonium, separates and is recovered by the usual means. At the same time the remaining portion of the Prussian blue contained in the residue and not extracted by the ammonium sulfid is dissolved into calcium ferrocyanid with precipitation of ferric hydroxid. It is of great importance that this residue separated from the solution containing the polysulfid of ammonium should not be exposed to the air and should be immediately diluted with water, because the double sulfid of iron and ammonium which this residue contains would oxidize rapidly in the air giving iron oxid, sulfur and liberating ammonia which would be lost. On the other hand the sulfur formed would give, in the presence of lime and Prussion blue, sulfocyanids which would decrease the yield of ferrocyanid. In order to avoid the action of the air, the preceding operations are undertaken in closed vats provided with mechanical mixers and heating coils. For the same purpose care should be taken to use as filtering apparatus, pressure filters and mechanical filters with internal collectors, which enables all escape to be avoided. The material obtained after treatment with lime is filtered and gives a solution containing ferrocyanids and sulfocyanids of calcium which are extracted by known means, and a residue containing a precipitate of ferric hydroxid, iron sulfid, wood saw-dust, etc. The material is allowed to oxidize in the air and is thus regenerated so that it can be used again for the purification of gas. Finally a portion of the precipitated sulfur obtained is transformed into vapor in a suitable container, then combined with hydrogen, by admitting the latter to the container, to form hydrosulfuric acid $H_2S$. This acid is absorbed by the ammoniacal solution provided by the treatment with lime and gives neutral ammonium sulfid. In this way the fraction of the latter body, which was decomposed by the iron oxid is recovered. This is added to the other portion already obtained due to the decomposition of the solution containing the polysulfid, in order to treat a fresh quantity of the spent material.

The process above described may also, except for certain modifications, be applied to the treatment of spent oxid or crüd d'ammoniaque used for agricultural purposes for destroying insects and weeds. This substance generally contains soluble salts of ammonia, sulfur, sulfo- and ferrocyanids and nitrogenous organic materials. The substance is first treated by ammonium sulfid in accordance with the process described above. By this means there is obtained: 1. A solution of the polysulfid of ammonium containing also sulfur, ammoniacal salts and soluble sulfo- and ferrocyanids. 2. A solid residue containing principally Prussian blue, iron sulfid, calcium sulfate, etc. The solution and the residue are separated by filtration and then treated separately.

1. The solution containing the polysulfid of ammonium is decomposed by steam in accordance with the process above described which gives on the one hand regenerated ammonium sulfid (about 80 to 90% of the original sulfid) which is used over again, and on the other hand precipitated sulfur which is separated from the remaining liquid by filtration or decantation, the sulfur being then refined in the usual way. The residual remaining liquid contains the ammoniacal salts, the soluble sulfocyanids and ferrocyanids, which are decomposed in a still by a wash of barium or calcium sulfid which reacts on the ammonium sulfate contained in the residual liquid according to the following formula:

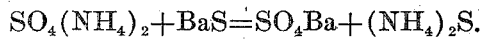
$$SO_4(NH_4)_2 + BaS = SO_4Ba + (NH_4)_2S.$$

The ammonium sulfid formed is reutilized and replaces in this way the 10 to 20% fixed during the preceding treatment. The barium or calcium sulfate is collected in a pressure filter, washed, dried and reduced by carbon to the condition of barium or calcium sulfid which is thus regenerated and can be used for the next operation. In this manner the ammonium sulfate formerly contained in the spent oxid or crüd d'ammoniaque is recovered in view of the economical regeneration of the ammonium sulfid. As regards the filtered liquid separated from the barium sulfate, this contains soluble sulfocyanids and ferrocyanids; these are utilized in the manner hereinafter described.

2. The residue resulting from the treatment of the spent oxid or crüd d'ammoniaque may be treated in three different ways. (a) The residue is diluted with the residual liquid obtained above in the filtration of the barium sulfate and is then treated at boiling point by a wash of lime or other alkali. This is separated from the ammonia which is collected in sulfuric acid in order to form ammonium sulfate. This ammonia is obtained from the ammonium sulfid formed during the previous treatment and the ferrocyanids and sulfocyanids of ammonium contained in the residual liquid and form a portion of the nitrogenous organic material. The substance is then filtered and a liquid and residue is obtained. The liquor contains prussiates and sulfocyanids of calcium and the greater part of the dissolved organic nitrogen; this liquor is evaporated to dryness, the product obtained being intimately mixed with its own weight of powdered lime and the whole is subjected to a kind of dry distillation in the presence of a current of steam. Under these conditions all the nitrogen contained in the residue in the form of prussiate, sulfocyanid or organic nitrogen, is transformed into ammonia which is collected in sulfuric acid in order to form a fresh quantity of ammonium sulfate. This operation is very easy, given the small quantity of foreign matters contained in the extract. Gases rich in ammonia and consequently easily absorbed without special apparatus are obtained. The saturation of the acid is thus effected by very hot gases, and evaporation of the solution is produced at the same time which effects a precipitation of ammonium sulfate. As on the other hand a certain quantity of hydrosulfuric acid is produced, very probably from the sulfocyanids contained in the extract, the gas is caused to be absorbed by the spent oxid or crüd d'ammoniaque before treatment by the ammonium sulfid; in this manner the fixation of the latter is diminished. The residue of this dry distillation which contains a high quantity of free lime, is utilized to a great extent in the following operation. As regards the residue separated from the liquid containing prussiate of lime, this is oxidized in air and constitutes a regenerated purifying material which can be used again in gas works. (b) Instead of treating the residue by a wash of lime it can be mixed with powdered lime and be caused to undergo a kind of dry distillation on the presence of a current of steam. Under these conditions all the nitrogen contained in the residue, either in the shape of Prussian blue or of organic material, is transformed into ammonia which is collected in sulfuric acid to form ammonium sulfate. This distillation is possible by reason of the primary extraction of the sulfur which contains the crüd d'ammoniaque. The condition will be different if the crüd d'ammoniaque is heated directly without first removing the sulfur. (c) A third method consists in drying and oxidizing the residue in a closed vessel and collecting in sulfuric acid the ammonia which is set free. The dry residue obtained at the end of this operation contains all the nitrogen of the Prussian blue and of the organic material. It can be advantageously utilized as manure and its agricultural value is increased by reason of the previous elimination of the sulfur and sulfocyanids which are harmful to plant life.

Apparatus suitable for carrying out the process is shown in the accompanying drawings, in which:—

Figure 2:
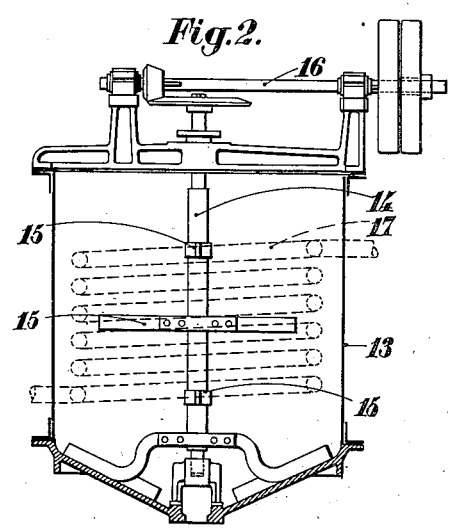

Figure 1 shows a diagrammatic view of an apparatus for decomposing ammonium polysulfid by means of steam. Fig. 2 shows a diagrammatic view of the masticating apparatus used.

The apparatus in Fig. 1 comprises a tank 1 which may be heated by a steam-jacket 2, the steam entering through the pipe 3 and going out through the pipe 4. The solution of polysulfid coming from a suitable receptacle is admitted in the tank by means of a pipe 5 and has an ascendant flow in the tank 1. The liquid leaves this tank by the pipe 6. The steam is admitted by the pipe 7 in a tapered cap 8 covering a cup 9, small notches 10 being provided for the escapement of the steam; the latter ascends in the tank 1 and escapes through a pipe 11 drawing along ammonium sulfid resulting from the decomposition of ammonium polysulfid. A drain cock 12 is provided at the lower part of the tank 1. In practice several apparatus are mounted in series; the pipe 6 of an apparatus is connected with the pipe 5 of the next one, and the pipe 11 of the first is connected with the pipe 7 of the second. Thus the polysulfid is progressively decomposed and the steam progressively charged with sulfid.

Fig. 2 shows a masticating apparatus 13 used for treating the spent oxid with ammonium sulfid. This apparatus comprises blades 15 keyed on a shaft 14 receiving its motion from a shaft 16. The same apparatus is used for the treatment of the residue by means of lime, but as this reaction is effected at the boiling point a worm 17 is used in which passes steam.

We claim:—

1. A process for extracting commercial products contained in the spent materials used for purifying gas comprising the treatment of the spent material with an alkaline sulfid.

2. A process for extracting commercial products contained in the spent materials used for purifying gas, consisting in treating the spent material with an alkaline sulfid, filtering the solution, then distilling the filtrate, and filtering and washing the residue left by such distillation, thereby obtaining free sulfur.

3. A process for extracting commercial products contained in the spent materials used for purifying gas, comprising the treating of the spent materials with neutral ammonium sulfid, filtering the solution thus obtained, then distilling the filtrate to form a residue containing sulfur and a distillate containing ammonium sulfid, and then washing and filtering the residue to obtain free sulfur.

4. A process for extracting commercial products contained in the spent materials used for purifying gas, comprising the treating of the spent materials with neutral ammonium sulfid, filtering the solution thus obtained, then subjecting the filtrate to a jet of live steam to entrain ammonium sulfid and leave a residue, and then washing the residue to obtain free sulfur.

5. A process for extracting commercial products contained in the spent materials used for purifying gas, comprising the treating of the spent materials with neutral ammonium sulfid, filtering the solution thus obtained to form a filtrate and a residue, then distilling the filtrate to form a second residue and a distillate, washing the last-named residue to obtain free sulfur and then diluting the first-named residue and treating with lime to free ammonia.

6. A process for extracting commercial products contained in the spent materials used for purifying gas, comprising the treating of the spent materials with neutral ammonium sulfid, filtering the solution thus obtained to form a filtrate and a residue, then distilling the filtrate to form a second residue and a distillate, washing the last-named residue to obtain free sulfur, diluting the first-named residue, treating with lime, filtering to obtain a filtrate composed of ferro-cyanids, and sulfo-cyanids of calcium, the residue being then oxidized to form a compound which can be used again for the purification of the gas.

In testimony whereof we affix our signatures, in presence of two witnesses.

HENRI GOUTHIÈRE.
PIERRE DUCANCEL.

Witnesses:
H. C. COXE,
EMILE KLOTZ.